United States Patent Office 3,725,076
Patented Apr. 3, 1973

3,725,076
COFFEE OF IMPROVED AROMA AND
FRESHNESS RETENTION
Arthur Stefanucci, Clifton, N.J., and Douglas R. Harnisch, Riverdale, Joseph E. Coogan III, Tarrytown, and Edward L. Scarsella, Bedford Hills, N.Y., assignors to General Foods Corporation, White Plains, N.Y.
No Drawing. Filed Dec. 21, 1970, Ser. No. 100,374
Int. Cl. A23f 1/02
U.S. Cl. 99—68                                                  3 Claims

ABSTRACT OF THE DISCLOSURE

Roasted coffee comprising a blend of non-high grade coffee which has been intermittently quenched prior to completion of the roast and high grade coffee quenched with cold water upon completion of the roast, is subjected to freezing and ground in the frozen state to produce a roasted and ground product characterized by improved aroma retention and freshness after storage under non-refrigerated conditions.

BACKGROUND OF THE INVENTION

Field of the invention

This invention relates to roasting green coffee, more particularly, to the new and improved steps of freezing roasted coffee at temperatures below the freezing point of water and grinding the coffee in the frozen state, in order to effect an improvement in the aroma retention and freshness of the coffee, both prior to and upon infusion of the blend. These novel steps contribute to enhanced aroma retention and freshness by preventing volatilization of oleaginous materials as well as flavors and aromas which may evolve during grinding. Apparently, the freeze grinding minimizes liquefaction of the oils by absorbing frictional heat generated during grinding. Freezing may also fix the water soluble volatiles by freezing the water present in the bean. As such, the aromatic and flavor retaining oils will not be evolved to the atmosphere, but will instead remain relatively solidified within the ground coffee particles.

Unexpectedly, freeze grinding also improves the freshness and aroma of the coffee after prolonged storage.

Description of the prior art

Scores of attempts have been made to prepare blends of roasted and ground coffee which are characterized by strong aroma retention and a freshness resembling that of brewed coffee. Most of these attempts have been primarily geared toward separation or isolation of essential coffee oils or other aromatic constituents from the roasted and/or ground coffee. These isolated coffee oils or other aroma constituents have been added back to the coffee utilizing many diversified techniques, however, the desideratum in the art was to effect a means for maximizing the retention of freshness and aroma without the necessity of initially separating essential coffee oils and other aroma constituents for ultimate addition—back to the coffee after grinding (or in the case of soluble coffee, after the coffee extract is dried).

In the case of U.S. Pat. No. 3,261,689, patentee was confronted with the task of attempting to aromatize dried soluble coffee by admixing roasted and ground coffee particles with the dried soluble coffee product without ultimately occasioning rancidity in the roasted and ground particles. An additionally burdensome problem to patentee was the usightly sediments of roasted and ground particles. To prevent sedimentation of the roasted and ground particles, patentee subdivided the roasted and ground coffee into fines of particulate powder thereby enabling all of said fines to pass through a 100 mesh U.S. Standard Sieve Screen and at least 50% to pass through a 200 mesh U.S. Standard Sieve Screen. Coffee fines of this size could not be obtained without developing a paste during the grinding process, therefore, the patentee co-ground frozen roasted coffee along with Dry Ice. This co-grinding eliminated paste development. These fines are added to coffee extract wherein they are partially brewed to free flavor and aroma constituents to the extract. The mixture is subsequently spray dried to produce a powderous coffee extract with fines largely encapsulated in the center of the dried soluble extract. The extract coating then acts as a barrier to prevent aroma and flavor loss.

SUMMARY OF THE INVENTION

It has now been discovered that novel means are available for attaining aroma retention and preserving freshness of roasted and regularly ground coffee. Accordingly, subjecting roasted whole beans, either single types or blends, decaffeinated or not, to temperatures below about 32° F. and grinding the resulting frozen beans produced enhanced aroma retention and freshness after prolonged storage.

This aroma retention and prolonged freshness is further improved if prior to freezing the roasted whole beans are seelctively subjected to successive quenching during roasting as set forth in U.S. Ser. No. 75,681, filed on Aug. 25, 1970.

The aroma retention and prolonged freshness is even further improved if the beans are subjected to the successive quenching, supra, prior to freezing, and immediately pressure packaged in an inert gas subsequent to freeze grinding.

The principal object of the invention is to provide means for improving the aroma retention of roasted and regularly ground coffee without resorting to procedures which entail isolating essential coffee oils or other aromatic constituents for addition back to the ground coffee.

Another object of the invention is to provide means for prolonging the freshness of roasted and regularly ground coffee, after storage above ambient temperature for protracted periods of time.

Other objects and advantages of the invention will become apparent in the description and examples hereinafter appearing.

DETAILED DESCRIPTION OF THE INVENTION

The process of the invention essentially entails subjecting roasted coffee beans to freezing temperatures below 32° F. for a period of time to effect a bean temperature of below 32° F. The beans are then ground to regular grind size at this temperature, and the ground particles may be permitted to reach temperatures in excess of ambient temperatures for purposes of storage.

Neither the rate of freezing nor the kind of freezing are critical. Consequently, as long as the freezing temperature is between about 32° F. and the temperature of liquefied gases, such will suffice. It is preferred, however, to employ a gaseous or liquid medium such as cold air or liquid nitrogen or the like to freeze the beans, and it is particularly preferred to lower the bean temperature to between about 32° F. and −30° F. prior to grinding.

Lowering the temperature of the beans to below 32° F. prior to grinding insures that water and oleaginous material present in the beans is solidified, thus preventing loss of aroma and flavor during grinding. While it is not understood, this step also improves the freshness of the roasted and ground product upon prolonged storage particularly at ambient temperatures and above.

Grind settings for the beans should be adjusted to provide conventional grind size distributions employed for regular coffee products and conventional percolation for soluble, i.e. the grind distribution should contain at least 90% larger than 100 mesh U.S. Standard Sieve Screen. Preferably, based upon U.S. Standard Sieve Screen, the grind distribution should be such that less than about 5% remains on a #12 screen; about 5 to 30% remains on a #16 screen; about 30 to 60% remains on a #20 screen; and the remainder is deposited in the pan.

The temperature-storage conditions under which the benefits of the invention are realized are not critical and may range from sub-freezing temperatures to about 110° F. However, it is to be expected that storage under refrigerated conditions would be superior to non-refrigeration conditions. Preferably, the freeze ground beans should be pressure packed at about 10 to 17 p.s.i.g. in an inert gas such as carbon dioxide, nitrogen, or the like.

If desired, the roasted and ground coffee may be extracted by conventional techniques to form a soluble coffee product.

The invention will now be described by reference to specific examples.

EXAMPLES I-V

Three types of coffee beans, milds, santos, and robusta were separately, conventionally roasted to their optimum roast colors. The three types of roasted coffee were then blended and the blend divided into five portions. Each of the portions was stored at the temperature at which the beans were to be ground. On reaching an equilibrium temperature, each portion of beans was ground in a standard coffee mill (gump grinder) to a grind distribution wherein at least 90% of the coffee was of a size larger than 100 U.S. Standard Mesh.

Specifically, one of the five portions of roasted and blended beans was stored at 68° F. and ground at that temperature in the gump grinder to give a grind distribution, based upon U.S. Standard Sieve, wherein less than about 5% remained on #12 mesh screen, about 5–30% remained on a #16 mesh screen, about 30–60% remained on a #20 mesh screen and the remainder was collected in the pan. The ground coffee was then vacuum-packed and stored for six weeks at 110° F.

In a similar manner, another portion of roasted beans was stored in a −20° F. room for a period of time sufficient to reach a temperature approximating −20° F. The frozen beans were then ground in the same gump grinder employed for the 68° variant, vacuum-packed and stored for six weeks at 110° F.

In a similar fashion, portions were stored at 110° F. and 50° F. until an equilibrium bean temperature approaching these conditions was reached. The beans were then ground, packaged and stored as previously described.

A fifth sample was prepared by mixing a portion of the roasted beans with dry ice, storing the mixture to allow the temperature of the mixture to equilibrate, and co-grinding this mixture to a grind size approximating that of the other samples.

As is apparent, all the samples were vacuum-packed and stored in a 110° F. room for six weeks. The six weeks storage samples were rated by experts for the quality of aroma available when the can was first opened, by odor, and the freshness of a stove-top brew, by tasting, prepared in a normal fashion. The following rating scales were employed:

QUALITY AROMA

1 — Most preferred.
2 — Moderately preferred.
3 — Neutral preference.
4 — Poor preference.
5 — Least preferred.

FRESHNESS SCALE

8 — Very fresh.
7 — Moderately fresh.
6 — Slightly fresh.
5 — Not fresh—not stale.
4 — Slightly stale.

The results of panel evaluation for aroma and freshness of the five portions follow:

|  | Grind temperature, ° F. | Quality aroma | Freshness scale |
|---|---|---|---|
| Example I | 68 | 3.9 | 5.7 |
| Example II | 110 | 4.9 | 5.7 |
| Example III | 50 | 2.3 | 5.6 |
| Example IV | −20 | 1.4 | 6.4 |
| Example V | (¹) | 2.6 | 5.2 |

¹ Co-grinding in Dry Ice below −80° F.

It is apparent from the data that frozen grinding to a conventional roast and ground particle size gave superior aroma and brew freshness, particularly when the beans were ground at a temperature below 32° F.

When this study is repeated employing a single type of coffee, such as milds, similar improvements in aroma and freshness are obtained from frozen grinding.

When this study is repeated, but the separately roasted types of coffee are separately ground and then blended, similar improvements in aroma and freshness are obtained from frozen grinding.

EXAMPLE VI

Same as Example IV, except that during roasting and prior to freeze grinding, the blend is successively or intermittently quenched according to the process set forth in U.S. Ser. No. 75,681 to add moisture in amounts ranging from about 3% to 40% by weight of the coffee.

EXAMPLE VII

Same as Example IV, except that following roasting and prior to freeze grinding, the coffee is quenched with cold water at temperatures ranging from about 34° F. to 40° F.

EXAMPLE VIII

Same as Example IV, except that following freeze grinding the coffee is immediately pressure packaged at between 10 to 17 p.s.i.g. in an inert gas selected from the variety of either carbon dioxide, nitrogen, argon, helium or the like. The pressure packing materially aids in improving aroma as well as impact freshness.

EXAMPLE IX

Same as Example IV, except that prior to freeze grinding the blend, separately roasted santos and robusta coffees are intermittently quenched during roasting according to the process of U.S. Ser. No. 75,681, and the milds coffee is cool quenched according to Example VII supra. Following freeze grinding of the blend, the coffee is pressure-packed as in Example VIII supra. The retention of quality aroma and freshness is best in this example and were respectively accorded values of 1.2 and 6.8.

While the invention has been described by references drawn to the above examples, the inventive concept is not limited thereto. Thus, in the purview of this invention, freeze grinding whole roasted coffee beans to regular grind size below freezing temperatures will result in improved quality aroma and freshness retention after storage at ambient temperatures or above. Moreover, it is to be understood that non-high grade coffee in the context of this invention is deemed to be santos and robusta coffees, whereas high grade coffee is to be understood as milds coffees. Further still, if desired, the coffee can be blended after freeze grinding each variety.

What is claimed is:

1. A process for improving the aroma retention and freshness of roasted and ground coffee comprising the steps of:
   (a) separately roasting non-high grade coffee,
   (b) intermittently quenching the non-high grade coffee during roasting to add moisture in amounts ranging from about 3% to 40% by weight
   (c) completing the roasting of the non-high grade coffee,
   (d) separately roasting high grade coffee,
   (e) quenching the roasted high grade coffee with cold water having a temperature from 34° F. to 40° F.,
   (f) blending the roasted non-high grade and roasted high grade coffees,
   (g) lowering the temperature of the coffee blend to a range from below 32° F. to −30° F., in order to freeze the coffee, and
   (h) conventionally grinding the frozen coffee so that at least 90% of the coffee has a particle size greater than 100 U.S. Standard Mesh.

2. The method of claim 1 wherein the temperature of the coffee blend is lowered to about −20° F.

3. The process of claim 1 wherein the roasted coffee is packaged in a vessel having an internal pressure of about 10 to 17 p.s.i.g. subsequent to lowering the temperature and grinding.

References Cited

UNITED STATES PATENTS

| | | | |
|---|---|---|---|
| 1,924,059 | 8/1933 | Hoskins | 99—152 |
| 2,583,697 | 1/1952 | Hendry, Jr., et al. | 241—8 X |
| 3,476,566 | 11/1969 | White et al. | 99—65 |
| 2,569,217 | 9/1951 | Bagdigian | 99—68 |
| 3,399,838 | 9/1968 | Hanser | 241—8 |
| 2,855,313 | 10/1958 | Bach | 99—68 X |

FRANK W. LUTTER, Primary Examiner

W. L. MENTLIK, Assistant Examiner

U.S. Cl. X.R.

99—152